3,463,779
ESTERS OF 6,7-DISUBSTITUTED-4-HYDROXY-
QUINOLINE-3-CARBOXYLIC ACID
Raymond Alexander Bowie, Mervyn Stuart Grant, and
William Glynne Moss Jones, Macclesfield, England,
assignors to Imperial Chemical Industries Limited, London, England, a corporation of Great Britain
No Drawing. Filed June 23, 1967, Ser. No. 648,245
Claims priority, application Great Britain, July 11, 1966,
30,974/66
Int. Cl. C07d 33/36, 33/46, 33/48
U.S. Cl. 260—287                    7 Claims

ABSTRACT OF THE DISCLOSURE

The invention relates to new 4-hydroxy-quinoline-3-carboxylic esters which are substituted in the 7-positior by an alkoxyalkoxy, aryloxyalkoxy or aralkyloxyalkoxy substituent and may also be susbtituted in the 6-position by an alkyl, alkenyl or alkoxy substituent. The new quinoline derivatives are useful for the prophylactic treatment of coccidiosis in poultry.

---

This invention relates to heterocyclic compounds and more particularly it relates to quinoline derivatives which possess anti-coccidial activity.

According to the invention we provide quinoline derivatives of the formula:

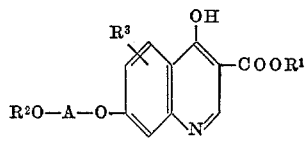

wherein $R^1$ stands for an alkyl or alkenyl radical, $R^2$ stands for an alkyl radical or for an aryl or aralkyl radical optionally bearing on the aryl nucleus one or more substituents selected from halogen atoms and alkyl, alkoxy, alkylthio and nitro radicals, A stands for an alkylene radical, and $R^3$ stands for hydrogen or an alkyl, alkenyl or alkoxy radical.

It is to be understood that the above definition of quinoline derivatives encompasses the quinoline derivatives when they are present in the tautomeric structure having the formula:

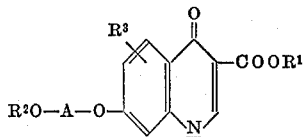

As a suitable value for $R^1$ when it stands for an alkyl radical there may be mentioned, for example, a straight- or branched-chain alkyl radical of not more than 6 carbon atoms, for example the methyl or ethyl radical. As a suitable value from $R^1$ when it stands for an alkenyl radical there may be mentioned, for example, an alkenyl radical of not more than 6 carbon atoms, for example the allyl radical.

As a suitable value for $R^2$ when it stands for an alkyl radical there may be mentioned, for example, an alkyl radical of not more than 10 carbon atoms, for example the n-butyl or n-octyl radical. As a suitable value for $R^2$ when it stands for an aryl radical there may be mentioned, for example, an aryl radical of not more than 10 carbon atoms, for example the phenyl radical, and as a suitable value for $R^2$ when it stands for an aralkyl radical there may be mentioned, for example, an aralkyl radical of not more than 15 carbon atoms, for example the benzyl radical. As suitable substituents which may be present on the aryl nucleus of $R^2$ when it stands for an aryl or aralkyl radical there may be mentioned, for example, one or more halogen atoms, for example chlorine atoms, or alkyl, alkoxy or alkylthio radicals of not more than 6 carbon atoms, for example, methyl, methoxy or methylthio radicals, or nitro radicals.

Thus a specific value for $R^2$ when it stands for an aryl or aralkyl radical is for example, the phenyl, benzyl, p-nitrophenyl, p-chlorophenyl, o-chlorophenyl, p-methylthiophenyl, p-tolyl or p-methoxyphenyl radical.

As a suitable value for A when it stands for an alkylene radical there may be mentioned, for example a straight- or branched-chain alkylene radical of not more than 10 carbon atoms, for example the ethylene, trimethylene or hexamethylene radical.

As a suitable value for $R^3$ when it stands for an alkyl or alkoxy radical, there may be mentioned, for example, an alkyl or alkoxy radical of not more than 10 carbon atoms, particularly such a radical of not more than 6 carbon atoms, for example the n-propyl, n-butyl, or n-propoxy radical. As a suitable value for $R^3$ when it stands for an alkenyl radical there may be mentioned, for example, an alkenyl radical of not more than 6 carbon atoms, for example the allyl radical.

A preferred value for $R^3$ is an alkyl or alkoxy radical of not more than 6 carbon atoms in the 6-position of the quinoline nucleus, for example the 6-n-propyl, 6-n-butyl or 6-n-propoxy radical.

Preferred quinoline derivatives of the invention are, for example, methyl 4-hydroxy-7-β-phenoxyethoxy-6-n-propylquinoline-3-carboxylate, methyl 4-hydroxy-7-β-phenoxyethoxyquinoline-3-carboxylate, methyl 6-n-butyl-4-hydroxy-7-β-phenoxyethoxyquinoline-3-carboxylate, methyl 6-n-butyl-4-hydroxy-7-β-(p-methylphenoxy) ethoxyquinoline-3-carboxylate and methyl 6-n-butyl-4-hydroxy-7-β-(p-methoxyphenoxy)ethoxyquinoline-3-carboxylate.

According to a further feature of the invention we provide a process for the manufacture of the quinoline derivatives of the invention which comprises the cyclisation of an anil of the formula:

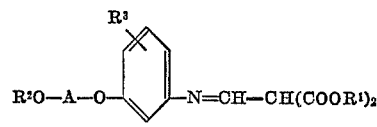

wherein $R^1$, $R^2$, $R^3$ and A have the meanings stated above.

The cyclisation may be carried out by, for example, heating the anil, conveniently at a temperature above 200° C., optionally in the presence of a diluent or solvent, for example diphenyl ether or "Dowtherm" A ("Dowtherm" is a trademark); or by the interaction of the anil with a phosphorus oxyhalide, for example phosphorus oxychloride, followed, if necessary, by hydrolysis of the 4-substituted quinoline derivative so formed.

It is to be understood that it is not necessary in the above process for the starting material to be a purified anil, and that a convenient method of carrying out the process is by the reaction of an aniline derivative of the formula:

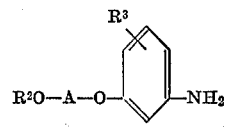

wherein R², R³ and A have the meanings stated above, with an ester of an alkoxymethylenemalonic acid of the formula:

$$R^4O.CH=C(COOR^1)_2$$

wherein R¹ has the meaning stated above and R⁴ stands for the methyl or ethyl radical, followed by cyclisation of the crude anil so formed.

According to a further feature of the invention we provide a process for the manufacture of the quinoline derivatives of the invention which comprises the esterification of an acid of the formula:

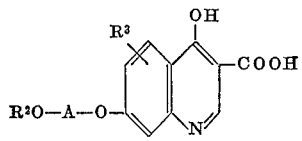

wherein R², R³ and A have the meanings stated above, with an alcohol of the formula R¹.OH, wherein R¹ has the meaning stated above.

The esterification may conveniently be carried out by conventional means, for example by the interaction of the alcohol of the formula R¹.OH with the above mentioned acid in the presence of a mineral acid catalyst, for example sulphuric acid or hydrochloric acid; or by the interaction of the said alcohol of the formula R¹.OH with an activated derivative of the above mentioned acid, for example the acid halide, for example the acid chloride.

The above mentioned acid of the formula:

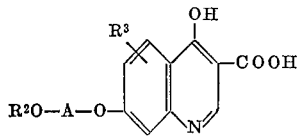

used as starting material in the above process may be obtained by the hydrolysis of the corresponding ester of the formula:

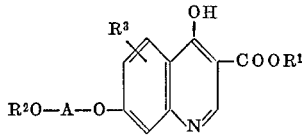

wherein R¹, R², R³ and A have the meanings stated above.

The hydrolysis may be carried out under acidic conditions, for example, in the presence of an inorganic acid, for example hydrochloric acid, or it may be carried out under basic conditions, for example, in the presence of an inorganic base, for example an alkali metal hydroxide, for example sodium hydroxide or potassium hydroxide. The hydrolysis may conveniently be carried out in the presence of a diluent or solvent, for example ethanol, water or acetone, and it may be accelerated or completed by the application of heat.

As stated above, the quinoline derivatives of this invention possess valuable anti-coccidial properties. They are especially active against the intestinal species *Eimeria brunetti*, and the preferred compounds are also active against the caecal species *E. tenella* and *E. necatrix*. They are therefore useful as the active ingredient in veterinary compositions such as concentrated food pre-mixes or medicated foodstuffs to be used for the prophylactic treatment of coccidiosis in poultry or other domestic animals.

According to a further feature of the invention, therefore, we provide veterinary compositions comprising one or more of the quinoline derivatives of the invention together with a non-toxic diluent or carrier.

The veterinary compositions may be, for example, concentrated food pre-mixes wherein the active ingredient is mixed with an inert diluent, for example kaolin, talc, calcium carbonate, fuller's earth, attapulgus clay or ground oyster shells, or is mixed with a foodstuff as diluent, for example whole ground corn, corn distillers, dry grain, wheat shorts or corn cob meal. It is intended that the said pre-mixes should be further diluted with an animal foodstuff in order to provide a suitable medicated foodstuff which can be eaten directly by poultry or other domestic animals. It is preferred that such medicated foodstuff compositions intended for direct feeding to poultry should contain between about 0.0001% and about 0.05% by weight of active ingredient in the composition, and more particularly between 0.0005% and 0.005% by weight in the food of the preferred active ingredients. It is likewise preferred that the concentrated pre-mixes should contain between about 0.1% and about 25% by weight of the active ingredient and more particularly between 0.2% and 5% by weight of the preferred active ingredients.

The veterinary compositions of the invention may additionally contain one or more other compounds of known veterinary utility, for example one or more known coccidiostats, anthelmintics, growth promotors, antibacterials or tranquilisers.

The invention is illustrated but not limited by the following examples in which the parts are by weight:

Example 1

A mixture of 82 parts of 3-β-phenoxyethoxy-4-n-propylaniline and 53 parts of dimethyl methoxymethylenemalonate is heated at 100° C. for 2 hours and then cooled. 110 parts of the crude dimethyl 3-β-phenoxyethoxy-4-n-propylanilinomethylenemalonate thus obtained are added to 440 parts of stirred boiling "Dowtherm" A ("Dowtherm" is a trademark). The solution is stirred and heated under reflux for 10 minutes and then allowed to cool. The crystalline solid which separates is filtered off, washed with methanol, and recrystallised from dimethylformamide. There is thus obtained methyl 4-hydroxy-7-β-phenoxyethoxy-6-n-propylquinoline-3-carboxylate, M.P. 274° C.

The 3-β-phenoxyethoxy-4-n-propylaniline may be obtained as follows:

A mixture of 70 parts of 3-hydroxy-4-n-propylacetanilide, 82 parts of β-phenoxyethyl bromide, 140 parts of anhydrous potassium carbonate and 700 parts of acetone is heated under reflux with stirring for 12 hours. The reaction mixture is filtered, and the acetone evaporated in vacuo. The residue is triturated with water and filtered and the residual solid recrystallised from aqueous ethanol. There is thus obtained 3-β-phenoxyethoxy-4-n-propylacetanilide (M.P. 95–96° C.), and 85 parts of this product are dissolved in a solution of 170 parts of potassium hydroxide in a mixture of 80 parts of water and 700 parts of ethanol. The solution is heated under reflux for 6 hours and allowed to cool. The crystalline product which separates is filtered, washed with water and recrystallised from aqueous ethyl alcohol. There is thus obtained 3-β-phenoxyethoxy-4-n-propylaniline, M.P. 90° C.

Example 2

The process described in Example 1 is repeated except that the 82 parts of 3-β-phenoxyethoxy-4-n-propylanilane are replaced by 69 parts of 3-β-phenoxyethoxyaniline, or by 72 parts of 3-γ-phenoxypropoxyaniline. There is thus obtained methyl 4-hydroxy-7-β-phenoxyethoxyquinoline-3-carboxylate, M.P. 252° C. or methyl 4-hydroxy-7-γ-phenoxypropoxyquinoline-3-carboxylate, M.P. 220° C. respectively.

Example 3

A mixture of 82 parts of 3-β - (p-nitrophenoxy)-ethoxyaniline and 3.7 parts of dimethyl methoxymethylenemalonate is heated at 100° C. for 30 minutes. The crude anil so formed and 30 parts of phosphorus oxychloride are then heated at 100° C. for 7 hours. The excess of phosphorus oxychloride is then evaporated, and a mixture of 150 parts of methanol and 1 part of concentrated hydrochloric acid is added to the residue. The mixture so obtained is heated under reflux for 7 hours, and is then cooled. 500 parts of water are then added, and the solid product is filtered off and recrystallised from dimethylformamide. There is thus obtained methyl 6-n-butyl-4-hydroxy-7-β-phenoxyethoxyquinoline-3-carboxylate, M.P. 273–275° C.

The 4-n-butyl-3-β-phenoxyethoxyaniline used as starting material may be obtained by repeating the process described in the second part of Example 1, except that 70 parts of 3-hydroxy-4-n-propylacetanilide are replaced by 74 parts of 4-n-butyl-3-hydroxyacetanilide. There is thus obtained 4-n-butyl-3-β-phenoxyethoxyaniline, M.P. 71–73° C.

Example 4

A mixture of 82 parts of 3 - β - (p - nitrophenoxy)-ethoxyaniline and 53 parts of dimethyl methoxymethylenemalonate is heated at 100° C. for 2 hours and then cooled. 110 parts of the crude dimethyl 3-β-(p-nitrophenoxyl)-ethoxyanilinomethylenemalonate thus obtained are added to 440 parts of stirred boiling "Dowtherm" A ("Dowtherm" is a trademark). The solution is stirred and heated under reflux for 10 minutes and then allowed to cool. The crystalline solid which separates is filtered off, washed with methanol, and recrystallised from dimethylformamide. There is thus obtained methyl 4-hydroxy-7-β-(p-nitrophenoxy)ethoxyquinoline - 3 - carboxylate, M.P. 272° C.

The 3-β-(p-nitrophenoxy)ethoxyaniline may be obtained as follows:

A mixture of 55 parts of 3-hydroxyacetanilide 90 parts of β-(p-nitrophenoxy)ethyl bromide, 140 parts of anhydrous potassium carbonate and 700 parts of acetone is heated under reflux with stirring for 12 hours. The reaction mixture is filtered, and the acetone evaporated in vacuo. The residue is triturated with water and filtered and the residual solid recrystallised from aqueous ethanol. There is thus obtained 3-β-(p-nitrophenoxy)ethoxyacetanilide, and 85 parts of this product are dissolved in a solution of 170 parts of potassium hydroxide in a mixture of 80 parts of water and 700 parts of ethanol. The solution is heated under reflux for 6 hours and allowed to cool. The crystalline product which separates is filtered, washed with water and recrystallised from aqueous ethyl alcohol. There is thus obtained 3-β-(p-nitrophenoxy) ethoxyaniline, M.P. 115° C.

Example 5

The procedure described in Example 4 is repeated except that the β-(p-nitrophenoxy)ethyl bromide is replaced by β-(p-chlorophenoxy)ethyl bromide, β-(ochlorophenoxy)ethyl bromide, β-benzyloxyethyl bromide or β-(n-octyloxy)ethyl bromide, and there is thus obtained methyl 4 - hydroxy - 7 - β - (p - chlorophenoxy)ethoxyquinoline-3-carboxylate, M.P. 265° C., methyl 4-hydroxy-7-β-(o-chlorophenoxy)ethoxyquinoline-3-carboxylate, M.P. 260° C., methyl 4 - hydroxy - 7 - β - benzyloxyethoxyquinoline-3-carboxylate, M.P. 219° C., or methyl 4-hydroxy-7-β - n - octyloxyethoxyquinoline - 3 - carboxylate, M.P. 239° C. respectively, by way of 3-β-(p-chlorophenoxy)-ethoxyaniline, M.P. 108° C., 3-β-(o-chlorophenoxy)-ethoxyaniline, M.P. 97° C., 3-β-benzyloxyethoxyaniline, B.P. 190° C./1.5 mm. or 3-β-n-octyloxyethoxyaniline (corresponding acetanilide derivative, M.P. 50° C.) respectively.

Example 6

The procedure described in the first part of Example 4 is repeated except that the 3-β-(p-nitrophenoxy)ethoxyaniline is replaced by 3-β-(p-methylthiophenoxy)ethoxyaniline. There is thus obtained methyl 4-hydroxy-7-β-(p-methylthiophenoxy)ethoxyquinoline-3-carboxylate, M.P. 250° C.

The 3-β-(p-methylthiophenoxy)ethoxyaniline may be obtained as follows:

42 parts of 4-(methylthio)phenol are dissolved in a solution of 7 parts of sodium in 400 parts of ethanol, and the resulting solution is added to 80 parts of 3-β-bromoethoxyacetanilide during a period of 45 minutes. The reaction mixture is heated under reflux for 6 hours, and the ethanol is then evaporated. The residue is triturated with water, filtered and the solid recrystallised from ethanol. There is thus obtained 3-β-(p-methylthiophenoxy)ethoxyacetanilide, M.P. 145° C. 49 parts of this product are dissolved in a solution of 100 parts of potassium hydroxide in a mixture of 50 parts of water and 400 parts of ethanol. The solution is heated under reflux for 6 hours, cooled and filtered. The solid is recrystallised from ethanol. There is thus obtained 3-β-(p-methylthiophenoxy)ethoxyaniline, M.P. 113° C.

Example 7

The procedure described in the first part of Example 4 is repeated except that the 3-β-(p-nitrophenoxy)ethoxyaniline is replaced by 4-n-butyl-3-β-(p-methylphenoxy) ethoxyaniline. There is thus obtained methyl 6-n-butyl-4-hydroxy - 7 - β - (p - methylphenoxy)ethoxyquinoline - 3-carboxylate, M.P. 260° C.

The 4 - n - butyl - 3 - β - (p - methylphenoxy)ethoxyaniline used as starting material may be obtained as follows:

A mixture of 74 parts of 4-n-butyl-3-hydroxyacetanilide, 85 parts of β-(p-methylphenoxy)ethyl bromide, 140 parts of anhydrous potassium carbonate and 700 parts of methyl ethyl ketone is stirred and heated under reflux during 12 hours. The reaction mixture is cooled and filtered, and the filtrate evaporated. The residue is triturated with water, filtered, and the solid recrystallised from ethanol to give 4-n-butyl-3-β-(p-methylphenoxy)-ethoxyacetanilide, M.P. 102° C. 85 parts of this product are dissolved in a solution of 170 parts of potassium hydroxide in a mixture of 80 parts of water and 700 parts of ethanol. The resulting solution is heated under reflux during 6 hours, cooled and filtered. The solid product is recrystallised from aqueous ethanol to give 4-n-butyl - 3 - β - (p - methylphenoxy)ethoxyaniline, M.P. 62° C.

Example 8

The procedure described in Example 7 is repeated except that the β-(p-methylphenoxy)ethyl bromide is replaced by β-(p-methoxyphenoxy)ethyl bromide. There is thus obtained methyl 6-n-butyl-4-hydroxy-7-β-(p-methoxyphenphenoxy)ethoxyquinoline - 3 - carboxylate, M.P. 258° C., by way of 4-n-butyl-3-β-(p-methoxyphenoxy)-ethoxyaniline, M.P. 67° C.

Example 9

The procedure described in Example 3 is repeated except that the 4-n-butyl-3-β-phenoxyethoxyaniline is replaced by 4-n-butyl-3-ω-phenoxyhexyloxyaniline, and the reaction with phosphorus oxychloride is conducted for 4 hours instead of 7 hours. There is thus obtained methyl 6 - n - butyl - 4 - hydroxy - 7 - ω - phenoxyhexyloxy-quinoline-3-carboxylate, M.P. 224° C.

The 4-n-butyl-3-ω-phenoxyhexyloxyaniline may be obtained as follows:

52 parts of 4-n-butyl-3-hydroxyacetanilide are dissolved in a solution of 6 parts of sodium in 400 parts of ethanol, and the resulting solution is stirred while 64 parts of ω-phenoxyhexyl bromide are added dropwise. The reaction mixture is heated under reflux during 18 hours, after which it is cooled and filtered. The filtrate is evaporated, and the residue is triturated with petroleum ether (B.P. 60–80° C.), and then filtered. The crystalline residue is triturated with water, filtered and then crystallised from aqueous ethanol. There is thus obtained 4-n-butyl-3-ω-phenoxyhexyloxyacetanilide, M.P. 73° C. 48 parts of this product are dissolved in a solution of 80 parts of potassium hydroxide in a mixture of 40 parts of water and 300 parts of ethanol. The solution is heated under reflux during 6 hours, cooled and evaporated. The residual oil is triturated with water and the suspension is extracted with ether. The ethereal extract is dried and evaporated to give 4-n-butyl-3-ω-phenoxyhexyloxyaniline as an oil.

Example 10

The procedure described in the first part of Example 3 is repeated except that the 4-n-butyl-3-β-phenoxyethoxyaniline is replaced by 3-β-n-butoxyethoxyaniline and there is thus obtained methyl 7-β-n-butoxyethoxy-4-hydroxyqinoline-3-carboxylate, M.P. 236° C.

The 3-β-n-butoxyethoxyaniline used as starting material may be obtained as an oil by repeating the process described in the second part of Example 4 except that the β-(p-nitrophenoxy)ethyl bromide is replaced by β-(n-butoxy)ethyl bromide.

Example 11

A mixture of 34 parts of 3-β-phenoxyethoxyaniline (M.P. 94° C.) and 32 parts of diethyl ethoxymethylenemalonate is heated at 100° C. for 2 hours and then cooled. 60 parts of the crude diethyl 3-β-phenoxyethoxyanilinomethylenemalonate thus obtained are added to 240 parts of stirred boiling "Dowtherm" A ("Dowtherm" is a trademark). The solution is stirred and heated under reflux for 15 minutes and then allowed to cool. The crystalline solid which separates is filtered off, washed with ethanol and recrystallised from dimethylformamide. There is thus obtained ethyl 4-hydroxy-7-β-phenoxyethoxyquinoline-3-carboxylate, M.P. 282° C.

The above procedure is repeated except that the 3-β-phenoxyethoxyaniline is replaced by 3-γ-phenoxypropoxyaniline, M.P. 82° C. There is thus obtained ethyl 4-hydroxy - 7 - γ - phenoxyethoxyquinoline-3-carboxylate, M.P. 256° C.

Example 12

5 parts of 4-hydroxy-7β-phenoxyethoxyquinoline-3-carboxylic acid are dried in vacuo and added to a solution of 2 parts of thionyl chloride in 180 parts of benzene. The reaction mixture is heated under reflux for 10 hours, cooled, filtered and the solid product is washed with benzene to give 4-hydroxy-7-β-phenoxyethoxyquinoline-3-carboxylic acid chloride, M.P. 221°C. 5.2 parts of this acid chloride are added to 230 parts of allyl alcohol, and the solution is heated under reflux at 100° C. for 10 minutes. The reaction mixture is cooled and neutralised with ammonia. Ether is added, and a white gel so formed is filtered off, washed with ether, dried, triturated with water and filtered. The product is then recrystallised from dimethylformamide. There is thus obtained allyl 4-hydroxy - 7-β-phenovyethoxyquinoline - 3-carboxylate, M.P. 259° C.

The 4 - hydroxy - 7 - β - phenoxyethoxyquinoline-3-carboxylic acid is obtained as follows:

6 parts of ethyl 4-hydroxy-7-β-phenoxyethoxyquinoline-3-carboxylate are suspended in 35 parts of 2N-sodium hydroxide solution. The suspension is heated under reflux for 3 hours, cooled and filtered. The solid is washed with water, and then triturated with 10% hydrochloric acid. The suspension is filtered, and the solid so obtained is washed with water. There is thus obtained 4-hydroxy - 7-β-phenoxyethoxyquinoline - 3-carboxylic acid, M.P. 242° C.

Example 13

5.8 parts of diethyl 3-β-phenoxyethoxy-4-n-propoxyanilinomethylenemalonate are added carefully to 30 parts of stirred, boiling diphenyl ether. The mixture is stirred and heated under reflux for 4 minutes and then cooled rapidly. The solid product is filtered, washed with petroleum ether (B.P. 40–60° C.) and crystallised from dimethylformamide. There is thus obtained ethyl 7-β-phenoxyethoxy - 4 - hydroxy - 6 - n - propoxyquinoline-3-carboxylate, M.P. 267–268° C.

The diethyl 3-β-phenoxyethoxy - 4 - n-propoxyanilinomethylenemalonate used as starting material may be obtained as follows:

A mixture of 3.7 parts of 3-β-phenoxyethoxy-4-n-propoxyaniline and 2.8 parts of diethyl ethoxymethylenemalonate is heated at 100° C. for 4 hours and allowed to cool overnight. There is thus obtained diethyl 3-β-phenoxyethoxy - 4 - n-propoxyanilinomethylenemalonate, M.P. 95–96° C.

The 3 - β - phenoxyethoxy - 4 - n - propoxyaniline may be obtained as follows:

A mixture of 8.8 parts of 3-β-phenoxyethoxy-4-n-propoxyacetanilide, 100 parts ethanol, 15 parts of potassium hydroxide, and 6 parts of water is stirred and heated under reflux for 6 hours. The solution is then cooled and evaporated under reduced pressure, and the residue is partitioned between water and ether. The ethereal layer is separated, washed with saturated sodium chloride solution, dried, and evaporated, and the residue is crystallised from methanol. There is thus obtained 3-β-phenoxyethoxy-4-n-propoxyaniline, M.P. 92–93° C.

The 3-β-phenoxyethoxy-4-n-propoxyacetanilide may be obtained as follows:

A mixture of 10 parts of 3-hydroxy-4-n-propoxyacetanilide, 10 parts of β-phenoxyethyl bromide, 3.5 parts of potassium carbonate, and 80 parts ethanol is stirred and heated under reflux for 72 hours. The mixture is filtered hot, and the filtrate is evaporated under reduced pressure. The residue so obtained is dissolved in chloroform, and the solution washed successively with dilute sodium hydroxide solution and saturated sodium chloride solution. The chloroform solution is then dried and evaporated, and the residue is recrystallised from acetone. There is thus obtained 3-β-phenoxyethoxy-4-n-propoxyacetanilide, M.P. 132–133° C.

The 3-hydroxy-4-n-propoxyacetanilide may be obtained as follows:

A mixture of 18.5 parts of 3-hydroxy-4-n-propoxyaniline, 150 parts of water, and 11 parts of acetic anhydride is heated at 100° C. for 10 minutes. The aqueous layer is decanted and cooled, and the residue is treated with benzene. The solids so obtained by these procedures are filtered and crystallised from ethyl acetate/petroleum ether (B.P. 40–60° C.). There is thus obtained 3-hydroxy-4-n-propoxyacetanilide, M.P. 142° C.

The 3-hydroxy-4-n-propoxyaniline may be obtained as follows:

A mixture of 28.7 parts of 3-benzyloxy-4-n-propoxynitrobenzene, 80 parts acetone, and 0.6 part 5% palladium on charcoal catalyst is hydrogenated at atmospheric pressure and ambient temperature until no more hydrogen is absorbed. The mixture is filtered, and the filtrate is evaporated. There is thus obtained 3-hydroxy-4-propoxyaniline as an oil.

The 3 - benzyloxy-4-n-propoxynitrobenzene, M.P. 73–74° C., may be obtained by using the procedure described in Example 28 of U.K. patent specification No. 1,070,223.

Example 14

A mixture of 10 parts of dimethyl 3-β-phenoxyethoxy- 4 - n-propoxyanilinomethylenemalonate and 25 parts of phospohorus oxychloride is heated at 100° C. for 2.5 hours. The excess of phosphorus oxychloride is evaporated, and a mixture of 60 parts of pure methanol and 0.7 part concentrated hydrochloric acid is added to the residue. The mixture is heated under reflux for 6 hours. The reaction mixture is cooled and poured onto ice. The precipitated solid is filtered, washed with water, dried, and crystallised from dimethylformamide. There is thus obtained methyl 7 - β - phenoxyethoxy-4-hydroxy-6-n-propoxyquinoline-3-carboxylate, M.P. 259–260° C.

The dimethyl 3-β-phenoxyethoxy-4-n-propoxyanilinomethylenemalonate used as starting material may be obtained as described in Example 13 except that the 3.7 parts of diethyl ethoxymethylenemalonate are replaced by 2.3 parts of dimethyl methoxymethylenemalonate. The residue is crystallised from benzene/petroleum ether (B.P. 40–60° C.). There is thus obtained dimethyl 3-β-phenoxyethoxy - 4 - n-propoxyanilinomethylenemalonate, M.P. 88–89° C.

Example 15

A mixture of 9 partst of dimethyl 3-β-(p-methylphenoxy)ethoxy - 4 - n - proproxyanilinomethylenemalonate and 20 parts of phosphorus oxychloride is heated at 100° C. for 2.5 hours. The excess of phosphorus oxychloride is evaporated and a mixture of 60 parts of pure methanol and 0.7 part concentrated hydrochloric acid is added to the residue. The mixture is heated under reflux for 6 hours. The reaction mixture is cooled and poured onto ice. The precipitated solid is filtered, washed with water, dried, and crystallised from dimethylformamide. There is thus obtained methyl 7-β-(p-methylenephenoxy)ethoxy-4 - hydroxy - 6-n-propoxyquinoline-3-carboxylate, M.P. 259–260° C.

The dimethyl 3 - β - (p-methylphenoxy)ethoxy-4-n-propoxyanilinomethylenmalonate used as starting material may be obtained from 3-hydroxy-4-n-propoxyacetanilide by the procedure described in Example 13 except that the β-phenoxyethyl bromide is replaced by β-(p-methylphenoxy)ethyl bromide. There are thus obtained 3 - β - (p - methoxyphenoxy)ethoxy-4-n-propoxyacetanilide, M.P. 145–146° C., 3 - β - (p-methylphenoxy)ethoxy-4-n-propoxyanilide, M.P. 77–78° C. and dimethyl 3 - β - (p - methylphenoxy)ethoxy-4-n-propoxyanilinomethylenemalonate as an oil.

Example 16

2 parts of methyl 6 - n-butyl-4-hydroxy-7-β-phenoxyethoxyquinoline - 3-carboxylate and 98 parts of whole ground core are thoroughly mixed in a blending machine. There is thus obtained a concentrated food pre-mix which may be mixed in suitable proportions with an animal foodstuff, and the medicated foodstuff so obtained can be fed to poultry for the prophylactic control of coccidiosis.

The whole ground corn in the above pre-mix may be replaced by corn distillers dry grain, wheat shorts, corn cob meal, fuller's earth, calcium carbonate, attapulgus clay or ground oyster shells.

Example 17

1 part of a concentrated food pre-mix, obtained as described in Example 16, is uniformly dispersed in 2000 parts of a commercial poultry starting mash. There is thus obtaned a medicated foodstuff suitable for feeding to poultry for the prophylactic control of coccidiosis.

What we claim is:

1. A substituted quinoline of the formula

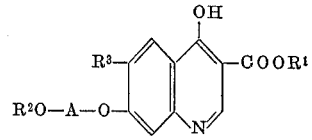

wherein $R^1$ is alkyl of up to 6 carbon atoms, $R^2$ is selected from the group consisting of phenyl, (lower alkyl) phenyl and (lower alkoxy) phenyl, A is ethylene, and $R^3$ is selected from the group consisting of hydrogen and alkyl of up to 6 carbon atoms.

2. A substituted quinoline as claimed in claim 1 wherein $R^1$ is selected from the group consisting of methyl and ethyl, $R^2$ is selected from the group consisting of phenyl, p-tolyl and p-methoxy-phenyl, A is ethylene, and $R^3$ is selected from the group consisting of hydrogen, n-propyl and n-butyl.

3. A substituted quinoline as claimed in claim 1 which is methyl 4 - hydroxy - 7-β-phenoxyethoxy-6-n-propylquinoline-3-carboxylate.

4. A substituted quinoline as claimed in claim 1 which is methyl 4 - hydroxy - 7 - β - phenoxyethoxyquinoline-3-carboxylate.

5. A substituted quinoline as claimed in claim 1 which is methyl 6 - n - butyl - 4 - hydroxy-7-β-phenoxyethoxyquinoline-3-carboxylate.

6. A substituted quinoline as claimed in claim 1 which is methyl 6 - n - butyl - 4 -hydroxy-7-β(p-methylphenoxy)ethoxyquinoline-3-carboxylate.

7. A substituted quinoline as claimed in claim 1 which is methyl 6 - n - butyl-4-hydroxy-7-β(p-methoxyphenoxy)ethoxyquinoline-3-carboxylate.

References Cited

UNITED STATES PATENTS 3,414,576 12/1968 Cairns et al. _____ 260—287
3,287,458 11/1966 Kaminsky _____ 260—287
3,290,315 12/1966 Watson _____ 260—287

ALEX MAZEL, Primary Examiner
D. G. DAUS, Assistant Examiner

U.S. Cl. X.R.
99—2; 260—471, 473, 544, 571; 424—258